Patented Dec. 5, 1950

2,532,515

UNITED STATES PATENT OFFICE 2,532,515

CATALYTIC CONDENSATION OF FURANS WITH COMPOUNDS CAPABLE OF YIELDING HYDROCARBON RADICALS

Herman Pines, Chicago, and Jerome A. Vesely, Evanston, Ill., assignors to Universal Oil Products Company, Chicago, Ill., a corporation of Delaware No Drawing. Application January 29, 1947,
Serial No. 725,150

7 Claims. (Cl. 260—345)

This invention relates to the catalytic interaction of condensible furans with compounds capable of yielding a hydrocarbon radical. It is more particularly concerned with the manufacture of alkyl furans by a process which comprises reacting an alkylatable furan with an alkylating agent in the presence of an alkylation catalyst containing boron and fluorine.

We have found that furan and certain substituted furans such as alkyl furans can be converted into valuable derivatives thereof in good yields by reaction with compounds capable of yielding a hydrocarbon radical in the presence of catalysts containing boron and fluorine. These derivatives are useful as intermediates in organic synthesis and in the production of plastics, germicides, medicinals, insecticides, and the like.

In one embodiment our invention relates to a condensation process which comprises reacting a furan containing a substitutable nuclear hydrogen atom with a compound capable of yielding a hydrocarbon radical at condensation conditions in the presence of a condensation catalyst containing boron and fluorine.

In a more specific embodiment our invention relates to an alkylation process which comprises reacting a furan containing a substitutable nuclear hydrogen atom with an alkylating agent at alkylating conditions in the presence of an alkylation catalyst containing boron and fluorine.

A furan which is capable of reacting with an alkylating agent in the presence of an alkylation catalyst containing boron and fluorine contains at least one hydrogen atom bound to the heterocyclic ring of four carbon atoms and one oxygen atom. The various reactive furans may be represented by the formula:

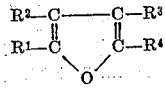

in which at least one of the groups $R^1$, $R^2$, $R^3$ and $R^4$ is a hydrogen atom and the other R groups are selected from the group consisting of hydrogen, alkyl, cycloalkyl, aryl, aralkyl, alkaryl, and naphthyl radicals. Nonhydrocarbon substituents such as a halogen atom or a methoxy or an alkylthio group may be present provided the furan contains at least one substitutable nuclear hydrogen atom.

Alkylating agents capable of yielding an alkyl group under the conditions of operation employed in the process are one type of compound capable of yielding a hydrocarbon radical that is utilizable in our process. Compounds of this nature include normally gaseous and normally liquid aliphatic and cyclic olefins such as propylene, butylenes, amylenes, and methylcyclohexene, cycloparaffins containing three or four carbon atoms in the ring, mercaptans, mineral acid esters such as alkyl halides, and alkoxy compounds of the class consisting of aliphatic alcohols, ethers, and esters of carboxylic acids. The various alkylating agents herein mentioned have the property of producing alkyl groups as intermediates or at least as transient intermediates during the course of the reactions which result in the formation of alkylated furan compounds. These alkylating agents are not to be regarded as equivalents; for milder operating conditions are needed when processing olefins, for example, than when processing ethers. Similarly, substituted cycloolefins are more easily reacted than non-substituted cycloolefins. Also, branched chain aliphatic olefins, such as 2-methyl-1-butene, alkylate furan more readily than straight chain olefins, such as normal pentene. Ethylene is quite unreactive. In general olefinic hydrocarbons that are most useful as alkylating agents in my process comprise the tertiary olefins, which are olefins that contain an unsaturated tertiary carbon atom, such as 2-methyl-2-butene or 1-methyl-1-cyclohexene.

Another type of compound capable of yielding a hydrocarbon radical that may be used in our process comprises compounds capable of yielding an olefinic radical at the conditions of operation employed in the process. Compounds of this type include polyolefins, particularly diolefins, diols, unsaturated alcohols, and the like. Examples of such compounds are 4-methyl-octatriene-3,5,7, isoprene, butadiene-1,3, 2-methyl-1,3-pentadiene, propylene glycol, and allyl alcohol. The various compounds herein mentioned have the property of producing olefinic groups as intermediates or at least as transient intermediates during the course of the reactions which result in the condensation of furans with said compounds. The preferred polyolefins are those of the aliphatic type although cyclic polyolefins and aromatic hydrocarbons containing a polyolefinic side chain also may be employed. These compounds are not to be regarded as equivalent; for different types of products are obtained depending upon the structure of the polyolefinic compound charged to the process and upon the operating conditions. For example, diolefins such as 2-methyl-1,3-pentadiene, in which only one of the double bonds is attached to the tertiary carbon atom, tend to yield alkenyl furans; whereas compounds such as 2,4-hexadiene in which both of the double bonds are similar, tend to yield difuryl alkanes. If both double bonds are tertiary, such as in 2,5-dimethyl-1-5-hexadiene, one molecule of furan reacts with both double bonds to form a bicyclic compound. In general it has been found that when alkenyl furans are desired the reaction conditions should be relatively mild and only one of the double bonds of the diolefins should be tertiary. When difuryl alkanes are desired the reaction conditions should be somewhat more severe, and the double bonds should be nontertiary.

Still another type of compound capable of yielding a hydrocarbon radical, that is utilizable in our process, is an aromatic compound in which one of the nuclear hydrogen atoms has been replaced by an olefinic hydrocarbon radical. Examples of such aromatic compounds are styrene, alpha methylstyrene, 1-phenylpropene, allyl benzene, 1-methyl-2-isopropenylbenzene, 2-phenylpentene-2, cyclobutenylbenzene, cyclopenten-1-ylbenzene, and the like. The aromatic ring may have one or more of the hydrogen atoms replaced by groups such as a halogen, hydroxy, methoxy, mercaptal, nitro, etc. In addition the aromatic ring may be mono- or polynuclear. However, the preferred type of alkenyl aromatic compounds are alkenyl aromatic hydrocarbons, particularly those in which the double bond of the alkenyl group is attached to a tertiary carbon atom. This latter type of compound is more readily reacted with furans and forms tertiary aralkyl-furans in which the aralkyl group is attached to the furan nucleus by means of a tertiary carbon atom.

The catalysts which may be used in this process consist of those boron and fluorine containing substances which catalyze the interaction of furan and substituted furans containing at least one replaceable nuclear hydrogen atom with compounds capable of yielding a hydrocarbon radical. Such catalysts include boron fluoride; boron fluoride+an acid fluoride such as sodium or potassium acid fluoride; mixtures of boron fluoride and hydrogen fluoride preferably containing an excess of the former; boron fluoride+fluosulfonic acid; mixtures of boron fluoride and water preferably containing two or more mols of water per mol of boron fluoride; mixtures of boron fluoride, water, and hydrogen fluoride in which the concentration of the latter generally is less than 50% of the mixture; addition compounds or complexes of boron fluoride and ethers such as boron fluoride-ethyletherate; boron fluoride alcoholates such as mono- and dimethanolates; coordination compounds of boron fluoride and aliphatic monobasic carboxylic acids such as are prepared by adding one mol of boron fluoride to one or two mols of an acid like acetic; addition compounds of boron fluoride and esters particularly the methyl and ethyl esters of monobasic aliphatic acids; and coordination complexes of boron fluoride with aldehydes, ketones, and acid halides. The activity of most of the foregoing complex catalysts may be modified by varying the proportions of the constituents. For example, an excess of ethyl ether over that required to produce boron fluoride-ethyletherate results in a milder catalyst. Since furan is very reactive, diluted, and hence less active, catalysts usually are desired to avoid decomposition of the furan. Some of the foregoing addition compounds are liquid whereas others are solids.

The process of my invention may be carried out in batch operation by placing a quantity of the catalyst in a reactor equipped with a stirring device, adding the furan, heating to the reaction temperature, slowly adding the compound capable of yielding a hydrocarbon radical while mixing the contents of the reactor, cooling the reaction mixture and recovering the product. However, the preferred method of operation is of the continuous type. If the catalyst is liquid it is continuously charged to the reactor together with the furan and the alkylating agent. The reactor effluent is passed to a settler wherein a separation is effected between the catalyst phase and the furan-hydrocarbon phase. At least a portion of the catalyst phase is continuously decycled to the reaction zone and the hydrocarbon-furan phase is processed for recovery of the desired products. If the catalyst is a solid it may be disposed as a fixed bed within a reactor and the reactants continuously passed through the bed at condensation conditions. The alkylate in the effluent is recovered and the unreacted hydrocarbons and furan may be separated and recycled to the condensation step for further reaction.

The solid catalysts mentioned herein may be used in the finely divided state in a "fluidized" type of operation. In this method of operation the charge is passed upwardly through a bed of finely divided catalyst causing the catalyst particles to become motionalized and forming a fluidlike mass. The catalyst is intermittently or continuously withdrawn from the reaction zone, regenerated if necessary, and returned thereto. Another type of operation employing solid catalyst is the "moving bed" operation wherein a compact bed of catalyst is continuously passed through the reaction zone concurrently or countercurrently to the incoming reactants and passed therefrom into a regeneration zone from which it is returned to the reaction zone after having been regenerated or revivified. Another alternative mode of operation comprises suspending finely divided solid catalyst in the stream of charge stock and treating said suspension under suitable conditions of temperature and pressure to produce the desired reaction.

The process of this invention may be conducted at temperatures within the range of from about −20° C. to about 175° C. The preferred temperature will depend to some extent upon the particular furan and compound capable of yielding a hydrocarbon radical being charged to the process and upon the activity of the particular catalyst being employed. The pressure should be such that substantially all of the reactants are in the liquid phase. In general, these pressures will lie within the range of from 1 to about 100 atmospheres. When a liquid catalyst is used, the contact time may be in the range of from about three minutes to about three hours. If a solid catalyst is used in a fixed bed, the liquid hourly space velocity, defined as the volume of total feed to the reaction zone divided by the superficial volume of catalyst in said zone, should be in the range of from about 0.1 to about 10. A molecular excess of the furan over the compound capable of a hydrocarbon radical in the reaction zone promotes condensation and suppresses undesirable side reactions.

The following examples are given to illustrate my invention but they are not introduced with the intention of unduly limiting the generally broad scope of said invention.

EXAMPLE I

The apparatus in this experiment consisted of a 250 cc. alkylating flask provided with a dropping funnel, thermometer, stirrer, and dry ice reflux condenser.

34 g. of furan, 2.5 cc. of boron fluoride ethyletherate, and 2.5 cc. of ethyl ether were charged to the alkylating flask. 17.5 g. of isoamylene was then charged to the flask during a period of 0.22 hour while the contents of the flask were stirred. During this time the temperature was maintained between 11° and 34.8° C. The mixture was then stirred for an additional 2.5 hours while the temperature was maintained at 34.8° C. At the end of the reaction time the product was treated with water, transferred to a separatory funnel, and the aqueous layer discarded. The organic layer was washed twice with water, three times with saturated sodium carbonate solution, three times with water, was dried over calcium chloride, and distilled using a 13 inch Podbielniak column with the following results:

*Distilation of furan and ether-free product*

| Cut | Vap. T., °C. | Press., mm. | CC. | Gms. | $n_D^{20}$ |
| --- | --- | --- | --- | --- | --- |
| 1 | 59 – 59.5 | 32.5 | 4.5 | 3.94 | 1.4459 |
| 2 | 59.5– 60 | 32.5 | 1.3 | 1.20 | 1.4459 |
| 3 | 60 –114.5 | 31.5 | 2.3 | 2.10 | 1.4462 |
| 4 | 114.5 | 31.5 | 2.0 | 1.65 | 1.4488 |
| Bottoms | | | | 4.79 | 1.4885 |

According to the distillation the following products were obtained:

Mono.-tert.-amyl furan:
 5.14 gms. or 17 mol per cent based on isoamylene charged.

Di-tert.-amyl furan:
 1.65 gms. or 3.2 mol per cent based on isoamylene charged.

EXAMPLE II

The apparatus employed in this experiment was the same as that described under Example I. 17 g. of furan and 5 cc. of boron fluoride-water were charged to the alkylating flask and stirred while 9.5 g. of 2-methyl pentadiene was added dropwise over a period of .1 hour. The molal ratio of boron fluoride to water was 1:3.2. The flask contents were stirred for an additional 1.23 hours while the temperature was maintained between 20.8° and 37° C. The product was treated with water, transferred to a separatory funnel, and the aqueous layer discarded. The organic layer was washed with water, 10% sodium hydroxide, water, dried over calcium chloride, and distilled with the folowing results:

| Cut | Vap. T., °C. | Press., mm. | CC. | Gms. | $n_D^{20}$ |
| --- | --- | --- | --- | --- | --- |
| 1 | 81–82 | 24 | 3.4 | 2.94 | 1.4725 |
| 2 | 82 | 24 | 5.8 | 5.35 | 1.4729 |
| 3 | 81.8 | 24 | 0.4 | 0.35 | 1.4730 |
| 4 | 47–48 | 2.5 | 0.6 | 0.31 | 1.4730 |
| 5 | 61–83 | 2.5 | 0.3 | 0.30 | 1.4730 |
| Bottoms | | | | 4.4 | |

According to the distillation the following products were obtained:

Mono-hexenyl furan:
 8.64 gms. or 46.1 mol per cent based on 2-methyl pentadiene charged.

Di-hexenyl furan:
 0.61 gm. or 2.1 mol per cent based on 2-methyl pentadiene charged.

We claim as our invention:

1. A process for producing an alkenyl furan which comprises reacting a diolefin with a molecular excess of a furan in the presence of a catalytic amount of a boron fluoride alkylation catalyst at a temperature within the range of from about −20° C. to about 175° C. and a pressure sufficient to maintain a substantial portion of the reactants in the liquid phase, said furan having the following structural formula:

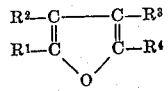

in which at least one of the groups $R^1$, $R^2$, $R^3$, and $R^4$ is a hydrogen atom and the other R groups are selected from the group consisting of hydrogen, alkyl, cycloalkyl, aryl, aralkyl, alkaryl, and naphthyl radicals.

2. A process for producing an alkenyl furan which comprises reacting a diolefin wherein one double bond connects carbon atoms, neither of which is tertiary, and the other double bond connects carbon atoms, at least one of which is tertiary, with a molecular excess of a furan in the presence of a catalytic amount of a boron fluoride alkylation catalyst at a temperature of from about −20° C. to about 175° C. and a pressure sufficient to maintain a substantial portion of the reactants in the liquid phase, said furan having the following structural formula:

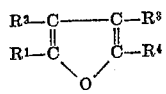

in which at least one of the groups $R^1$, $R^2$, $R^3$, and $R^4$ is a hydrogen atom and the other R groups are selected from the group consisting of hydrogen, alkyl, cycloalkyl, aryl, aralkyl, alkaryl, and naphthyl radicals.

3. A process for producing a hexenyl furan which comprises reacting 2-methyl-pentadiene with a molecular excess of a furan in the presence of a catalytic amount of a boron fluoride alkylation catalyst at a temperature within the range of from about −20° C. to about 175° C. and a pressure sufficient to maintain a substantial portion of the reactants in the liquid phase, said furan having the following structural formula:

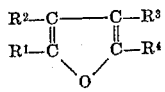

in which at least one of the groups $R^1$, $R^2$, $R^3$, and $R^4$ is a hydrogen atom and the other R groups are selected from the group consisting of hydrogen, alkyl, cycloalkyl, aryl, and aralkyl, alkaryl, and naphthyl radicals.

4. The process of claim 1 further characterized in that said boron fluoride alkylation catalyst comprises a major molecular proportion of water and a minor molecular portion of boron fluoride.

5. The process of claim 1 further characterized in that said boron fluoride alkylation catalyst comprises a complex of boron fluoride and an aliphatic ether containing an excess of ether.

6. The process of claim 2 further characterized in that said boron fluoride alkylation catalyst comprises a major molecular proportion of water and a minor molecular portion of boron fluoride.

7. The process of claim 2 further characterized in that said boron fluoride alkylation catalyst comprises a complex of boron fluoride and an aliphatic ether containing an excess of ether.

HERMAN PINES.
JEROME A. VESELY.

REFERENCES CITED

The following references are of record in the file of this patent:

UNITED STATES PATENTS

| Number | Name | Date |
|---|---|---|
| 2,284,554 | Beyerstedt | May 26, 1942 |
| 2,290,211 | Schaad | July 21 1942 |
| 2,423,470 | Simons | July 8, 1947 |
| 2,432,482 | Matuszak | Dec. 9, 1947 |

FOREIGN PATENTS

| Number | Country | Date |
|---|---|---|
| 187,117 | Switzerland | Jan. 2, 1937 |